United States Patent [19]
Petersen et al.

[11] Patent Number: 5,979,946
[45] Date of Patent: Nov. 9, 1999

[54] SNAP-IN END FITTING FOR PIPES

[75] Inventors: Horst Udo Petersen, Kitchener; Alfred D. Napolitano, Jr., Guelph, both of Canada

[73] Assignee: Bend All Manufacturing Inc., Ayr, Canada

[21] Appl. No.: 08/936,422

[22] Filed: Sep. 24, 1997

[51] Int. Cl.$^6$ ................................................. F16L 37/088
[52] U.S. Cl. ...................... 285/305; 285/143.1; 285/321; 285/921
[58] Field of Search .................... 285/321, 924, 285/237, 305, 921

[56] References Cited

U.S. PATENT DOCUMENTS

| | | |
|---|---|---|
| 1,159,845 | 11/1915 | Kidd . |
| 2,944,840 | 7/1960 | Wiltse ................................. 285/321 X |
| 3,315,990 | 4/1967 | Kramer . |
| 3,584,902 | 6/1971 | Vyse . |
| 3,695,646 | 10/1972 | Mommsen ........................... 285/321 X |
| 3,922,011 | 11/1975 | Walters ................................ 285/321 X |
| 4,645,245 | 2/1987 | Cunningham ........................... 285/321 |
| 4,690,436 | 9/1987 | Hehl ........................................ 285/321 |
| 4,707,000 | 11/1987 | Torgardh . |
| 4,793,637 | 12/1988 | Laipply et al. . |
| 4,884,829 | 12/1989 | Funk et al. . |
| 4,889,368 | 12/1989 | Laipply . |
| 5,273,323 | 12/1993 | Calmettes et al. . |
| 5,286,065 | 2/1994 | Austin et al. . |

FOREIGN PATENT DOCUMENTS

| | | |
|---|---|---|
| 827241 | 2/1960 | United Kingdom ................... 285/321 |
| 1213414 | 11/1970 | United Kingdom ................... 355/285 |
| 2194826 | 3/1988 | United Kingdom . |
| 2290591 | 3/1996 | United Kingdom . |

Primary Examiner—Dave W. Arola
Attorney, Agent, or Firm—Anthony Asquith & Co.

[57] ABSTRACT

An oil-pipe for an auto-engine has a quick-connect coupling. The pipe has a cold-pressed end-shape, which includes a radial flange. A clip abuts the flange, and secures the coupling. The larger the area of the flange, the more secure the clip, and a recess formed into the wall of the pipe immediately behind the flange adds area to the flange without requiring that the flange have a large external diameter. The recess can be rolled in, or can be formed by cold-pressing.

8 Claims, 4 Drawing Sheets

SNAP-IN END FITTING FOR PIPES

This invention relates to quick-connect-couplings for pipes, such as the pipes used to convey fluids in automotive engines.

A snap-in, quick-connect-coupling is shown in USA patent publication U.S. Pat. No. 5,472,242. The idea of a quick-connect-coupling is that the assembly operative on the production line can make the connection between the pipe and the corresponding port in the engine block, etc, by grasping the pipe, in the hand, and simply pushing the coupling on the end of the pipe into the port, whereupon the coupling snaps into place.

The designer sees to it that once the snap or click has been heard (and felt), the operative can move on, confident that thereafter the pipe is firmly held mechanically, and the seal will remain perfect, over a long service life. Often, the design of coupling is such as to permit the pipe to be removed later; sometimes, the couplings are intended to be permanent.

Such couplings are becoming widespread in automotive engines. It used to be considered that quick-connect-couplings were too dangerous: if not quite perfect the coupling would, for example, allow all the oil to leak out of the engine. Penny-pinching on the couplings was seen to be false economy.

But now, quick-connect-couplings are perceived to be reliable enough for automotive use, so that the aim is to economize on the manufacture of the coupling. The need is still paramount for the couplings to be such that the operator can easily perceive that the snap has taken place, and the design should be such that, because he heard the snap, he can be sure that thereafter the pipe is held firm, and the seal is good.

For economy, in '242 as in the present invention, the end-forms on the pipe, on which the coupling is based, are cold-pressed into the material of the pipe wall. Preferably, the forming operation is done as an axially-directed press on the material of the pipe wall, using form tools; the pipe diameter is expanded into the form tools to form a flange, by the agency of an axially-directed force on the pipe.

The size of the flange is important in determining the security of the quick-connect coupling. Generally, the larger the flange, the more secure. However, if the designer calls for too large a flange, i.e too large a proportion of the nominal pipe diameter, the material may tend to buckle or tear, and too high a scrap rate is encountered, which in turn means that inspection has to be rigorous (which is expensive). On the other hand, the flange should not be too small, or the connection will not be secure.

It is recognised that, in quick-connect-couplings of the kind that are suitable for automotive use, in fact the compromise is a tight one, between a flange that is so small that the snapped-in coupling is not mechanically secure, and so large that a high scrap rate spoils the economy of the product.

As mentioned, the basic shape of the flange is achieved by applying an axially-directed push to the end of the pipe. Certain problem areas are encountered by the designer when using an axial push to expand a pipe diametrally. One is the formed surface that lies perpendicular to the axis of the pipe; generally, this axially-facing surface is the area that deteriorates first if too large an expansion is called for. (It may be noted that it is not practical to support this area of the pipe material from the inside during forming operations.)

On the other hand, it is this axially-facing surface that the designer prefers to be large, since the larger that surface, the more mechanically secure the coupling can be.

The present invention lies in a manner of so designing the flange on the end of the pipe that the axially-facing-surface is large, and yet the overall expansion ratio required of the material of the pipe wall is relatively small.

GENERAL FEATURES OF THE INVENTION

In the invention, the pipe is formed with a recess behind the flange. The recess serves to extend the wall of the flange radially inwards. The clip lies partially in the recess. Thus, for the same overall diameter of the flange, the clip can engage a larger area.

DETAILED DESCRIPTION OF PREFERRED EMBODIMENTS

By way of further explanation of the invention, exemplary embodiments of the invention will now be described with reference to the accompanying drawings, in which.

Figure 3:
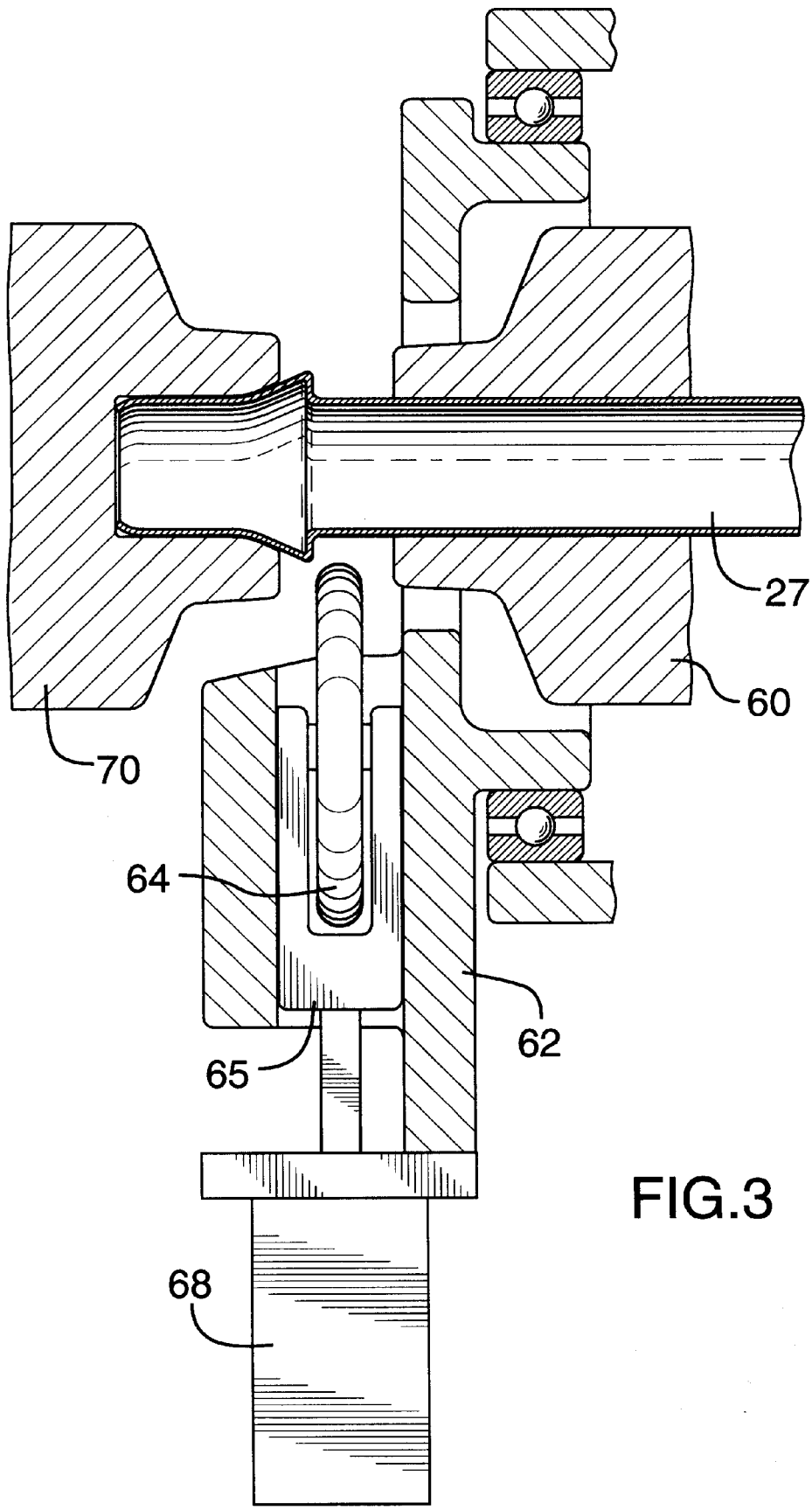
FIG. 3 is a cross-section of an end-of-pipe form, shown at an intermediate stage of manufacture.
Figure 4:
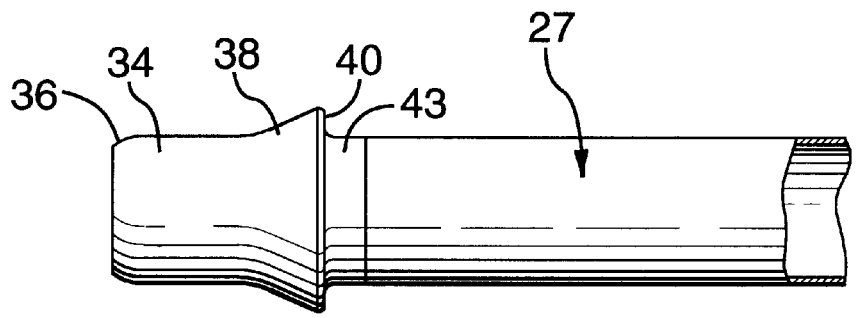
Figure 5:
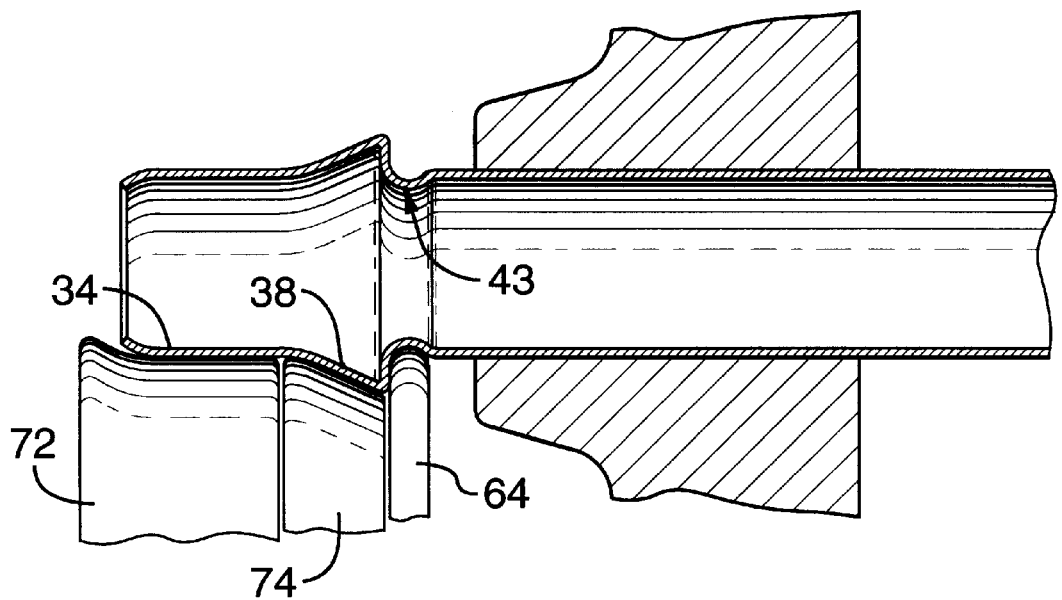
Figure 6:
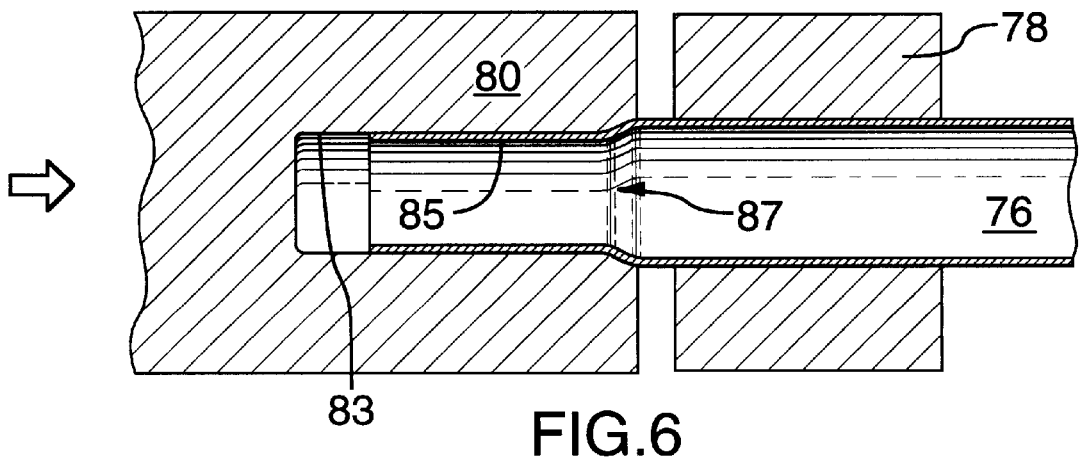
Figure 7:
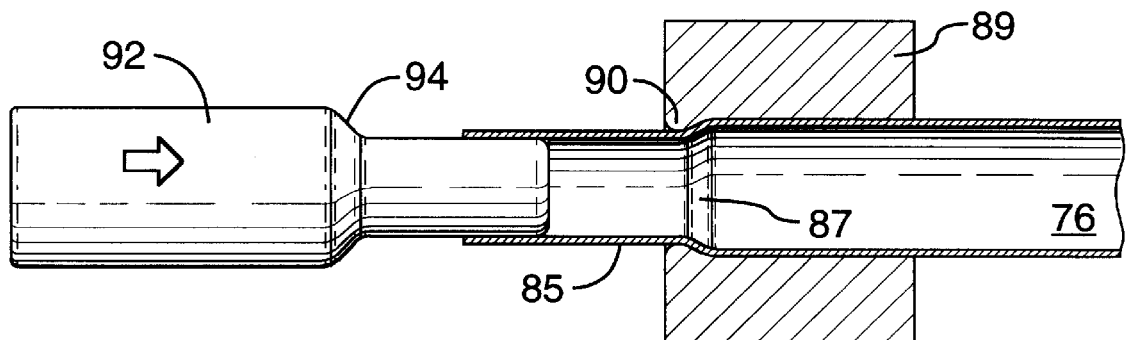
Figure 8:
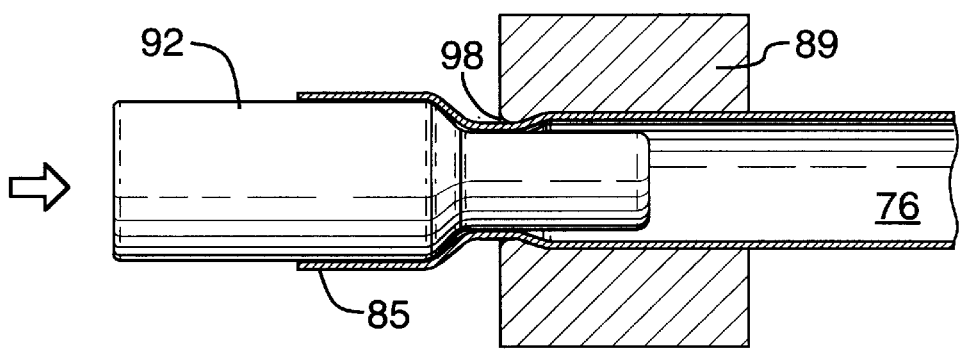
Figure 9:
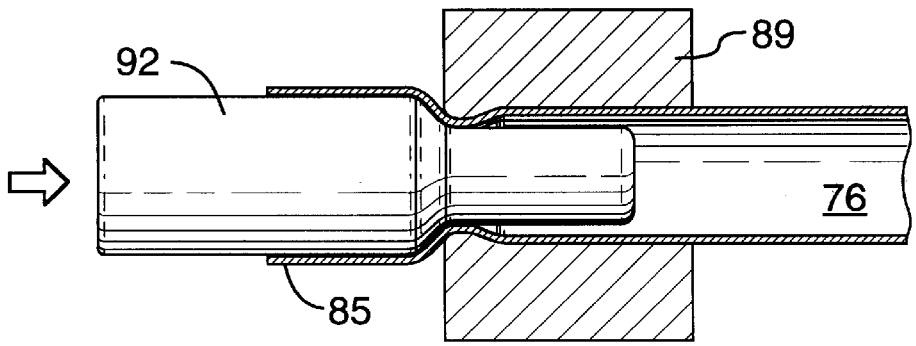

FIG. 4 a side elevation of a pipe, having an end-of-pipe from produced in the manner depicted in FIG. 3;

FIG. 5 is a variation on the stage shown in FIG. 3;

FIG. 6 is a cross-section of a pipe, being shaped in a press;

FIG. 7 is the cross-section of FIG. 6, shown at a later stage of manufacture;

FIG. 8 is the cross-section of FIG. 6, shown at a later stage of manufacture;

FIG. 9 is the cross-section of FIG. 6, shown at a later stage of manufacture.

The apparatuses shown in the accompanying drawings and described below are examples which embody the invention. It should be noted that the scope of the invention is defined by the accompanying claims, and not necessarily by specific features of exemplary embodiments.

Figure 1:
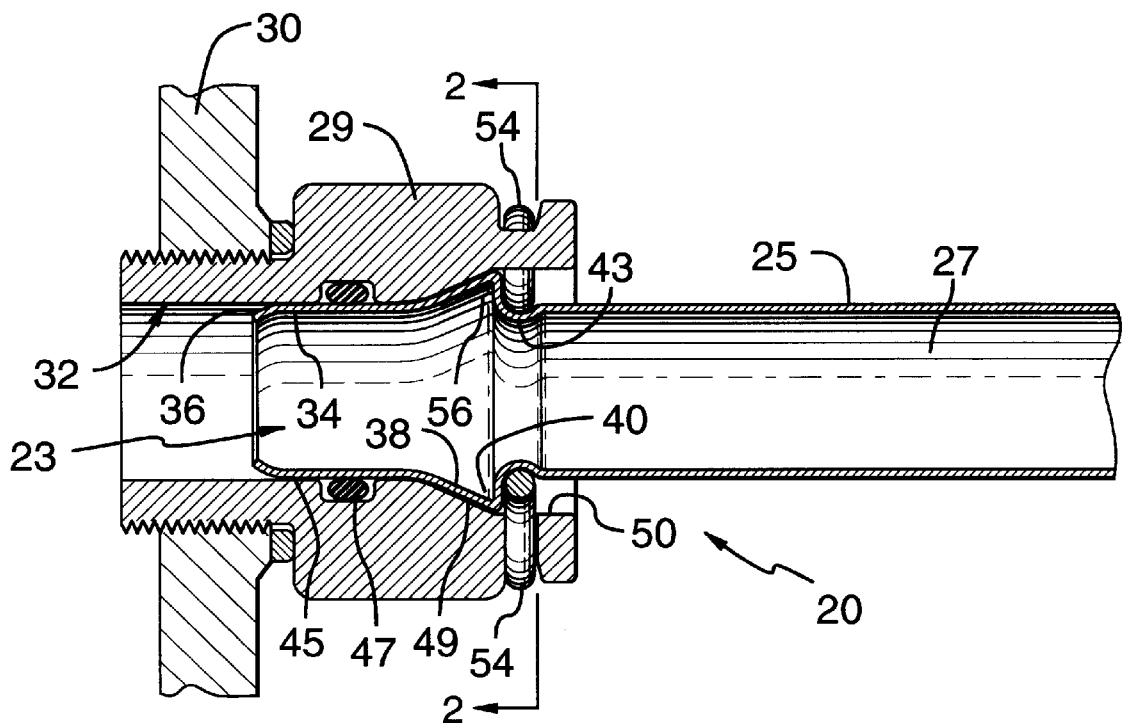
FIG. 1 is a cross-sectional view, on the line 1—1 of FIG. 2, of a quick-connect, push-in-and-snap, coupling, which embodies the invention.
Figure 2:
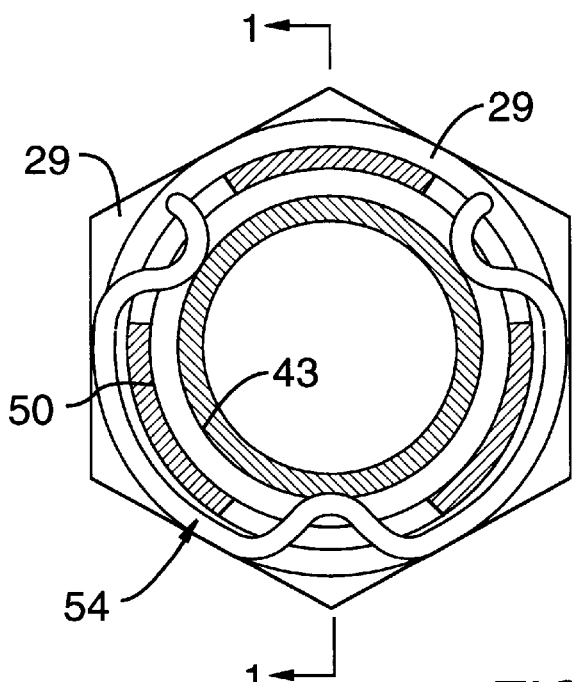
FIG. 2 is a cross-section on the line 2—2 of FIG. 1.

The coupling 20 shown in FIGS. 1 and 2 is based on the provision of an end-shape 23 cold-formed into the material of the wall 25 of the pipe 27. The pipe 27 is an oil-transfer pipe in an automotive engine. The coupling includes a body 29, turned from hexagonal bar, which is screwed into a tapped hole in the engine block 30. The body is screwed and tightened into the hole in the block (and checked and inspected) during an early stage in the manufacture of the engine, i.e prior to the assembly of the oil-pipe.

The profile of the end-shape 23 of the pipe 27 is complementary to the profile of the interior bore 32 turned in the body 29. The end-shape 23 of the pipe includes a cylindrical seal-face portion 34, a reduced seal-lead-in portion 36, a conical portion 38, an axially-facing flange-wall 40, and a reduced clip-receiving recess 43.

The profile of the bore 32 in the body includes a cylindrical portion 45 containing a seal groove 47, a conical portion 49, and a clearance portion 50. The body 29 has a clip-groove 52, which has three through-gaps, and a spring-clip 54 is disposed in relation thereto as shown in FIG. 2.

To assemble the coupling 20, the spring-clip 54 is first engaged into the clip-groove 52 in the body 29, and then the end-shape 23 of the pipe is introduced into the bore 32. As the pipe enters the bore (i.e moves leftwards in FIG. 1) the spring-clip rides up the conical portion 38, and is thereby expanded. Eventually, the spring-clip snaps over the edge or tip 56 of the conical portion of the pipe, and the clip snaps down into the clip-receiving recess 43.

The presence of the clip-receiving recess 43 in the pipe ensures that the clip fits snugly and firmly behind the flange-wall 40. The coupling would be insecure, to the extent that the coupling might become disconnected, if it were possible, during service, for the spring-clip to inadvertently ride up over the edge or tip 56. Therefore, the designer must see to it that the flange-wall 40 is deep; that is to say, that the radial width of the axially-facing annular area of the flange-wall 40 is large. In this context, it may be noted that the edge or tip 56 is not a sharp point, but is radiused, and the spring clip is of circular cross-section, and these aspects lead to the annular width of the flange-wall being in effect reduced.

A conflicting criterion facing the designer is that the overall increase in diameter of the pipe, being the diameter of the edge-or tip 56 of the conical portion 38, should be kept to a minimum. The greater the (proportional) increase in diameter, the more likely it is that the material of the pipe wall might buckle or tear during forming.

It will be understood that the provision of the recess 43 in the area just behind the flange-wall 40 permits the designer to provide a deep flange, for good clip security, but without having to resort to an undue degree of overall expansion of the pipe.

The reduction in diameter of the pipe caused by the presence of the recess 43, of course must inevitably restrict the flow of oil in the pipe. However, it may be noted that the reduction in diameter caused by the presence of the recess 43 is hardly any worse than the reduction caused by the presence of the seal-lead-in portion 36, which has to be provided in any event. Besides, such axially-short, localised, slight reductions have a much smaller effect on flow than would be encountered by, for example, changing the whole pipe for a pipe of a correspondingly reduced diameter. Thus, it is recognised that the presence of the recess 43 has only a small effect on the flow capacity of the pipe system.

The clip-receiving recess 43 may be manufactured in a number of ways, as will now be described.

Attention is directed to the techniques disclosed in USA patent publication U.S. Pat. No. 5,487,294 for forming flanged end-shapes on the ends of pipes by cold-forming. In FIG. 3, the end-shape as shown was formed using the techniques as disclosed in that patent.

In FIG. 3, the pipe is gripped between the two halves of a die 60. The machine tool in which the die is located is provided with a rolling station. The rolling station includes an arm 62, which is mounted for rotation in the machine, about the axis of the pipe 27. The arm 62 carries a roller 64. The axle of the roller 64 is carried in a slider 65, which is slidable in the direction towards and away from the pipe, its movement, and the force of its movement, being directed by a pneumatic ram 68.

Such a rolling station (of a type that is well-known per se) may be included as another processing station in the same machine tool in which the axially-directed pressing-operations, which manufactured the end-shape of the pipe, were carried out. A number of rollers (e.g three) are provided, pitched around the pipe, the rollers advancing in unison during the operation of forming the recess 43.

The roller 64 may be profiled as a complement to the final shape of the recess 43, whereby the roller only needs to be simply plunged towards and away from the pipe in a radial direction. In that case, the structure of the rolling station is simple.

Alternatively, in a more sophisticated rolling station, the roller may be mounted also for axial movement relative to the pipe, and that axial movement may be used to traverse the roller axially along the pipe, to produce a more elongated recess.

Preferably, the end of the pipe should be well-supported during the rolling operation, and a support 70 is shown in FIG. 3. The support may be moved into position axially, or the support may be in two halves, which are clamped onto the pipe radially (like the die 60).

FIG. 4 shows a pipe with an end-shape of the type that can be made at the FIG. 3 rolling station.

In FIG. 3, the finishing of the rest of the end-shape, apart from the recess 43, was carried out prior to the rolling operation. In FIG. 5, the rollers are so arranged as to roll some of the other portions of the end-shape.

The designer should see to it that the seal-face portion 34 of the end-shape is carefully manufactured, in order to ensure trouble-free hydraulic sealing during the service life of the coupling. Rolling the surface of this seal-face portion may be expected to aid in the provision of a good surface finish, and a suitable roller 72 is shown in FIG. 5, which is separate from the roller 64 which rolls the recess 43. Also, the roller 72 rolls the seal-lead-in portion 36, which also requires a good finish. A further roller 74 may be provided for rolling the conical section 38.

Each of the rollers 64,72,74 in fact is one of a respective set of three rollers, rollers pitched around the pipe.

With the use of the extra rollers, whereby final sizing of the surfaces is produced by the rolling operation, it may be possible to omit the final sizing operation described in '294, in which final sizing was performed as a separate axial strike. Another reason why it might be possible to get away with omitting the final sizing strike is that the now-reduced expansion proportion can permit the earlier strikes to be closer to the final size.

It should be noted that producing the end-shape 23 in the manner as described in '294 sometimes can leave the axis of the seal surface 34 somewhat out of alignment, i.e not quite co-axial, with the axis of the pipe. (This is of no consequence as far as the performance of the coupling itself is concerned.) It should be noted that, for the rolling operation to produce a good finish, and to ensure circularity (cylindricity) of the seal surface, the encirclement axis about which the rollers encircle the pipe should be co-axial with the axis of the seal surface, not with the axis of the pipe. The pipe, however, is held in the die 60 upon its pipe diameter, not upon its seal diameter. The designer should see to it that the means for squeezing the rollers radially onto the pipe can permit some radial float or run-out of the rollers, in case this co-axial mismatch between pipe diameter and seal diameter should arise.

In the case of the roller 64 that produces the recess 43, as shown in FIG. 3, the possibility of co-axial misalignment does not arise, because the recess 43 is of course rolled directly into the pipe diameter, which is held in the die 60. It is only when rollers are also being used to process the cylindrical surfaces produced by the strikes of the press that the possibility of co-axial misalignment occurs.

It is recognised that even a sophisticated roller station, which can accommodate axial traverse of the rollers, and can provide for radial float or run-out, can readily be accommodated in the press machine tool in which the cold-forming of the end-shape of the pipe is carried out. The means for feeding and locating the pipe in the rolling station can be the same as in the various other stations of the tool. It may be noted that if the pipe had to be taken out of the press machine tool, and re-located in a different (i.e separate) tool, the rolling operation might become much more expensive, to the extent that the use thereof might then be contra-indicated.

FIGS. 6–9 show another way In which the clip-receiving recess 43 may be manufactured, and that is by striking the pipe-end in the axial direction. Thus, it will be understood that it is not essential that the recess be produced by rolling.

In FIG. 6, the pipe 76 is gripped firmly in the clamping die 78, the die being in two halves, which are clamped together onto the pipe. Then, a female punch 80 having a hole 83 of smaller diameter than the pipe 76 is pressed over the protruding end 85 of the pipe, thus swaging-in, or reducing the cylindrical diameter of, the end 85 of the pipe, at a transition 87.

Next, as in FIG. 7, the pipe is transferred to another clamping die 89. This die has a radially-inwardly-directed promontory 90, which engages the transition 87. A punch 92 is inserted into the swaged-in end 85 of the pipe.

As shown in FIG. 8, as the punch 92 travels into the pipe, a conical portion 94 of the punch swages-out the pipe. It will be noted that the diameter to which the pipe is swaged-out is greater than the nominal diameter of the pipe 76.

The punch 92 continues until it bottoms against the die 89 (FIG. 9). That is to say, the punch continues until the right-facing conical surface 94 of the punch compresses a portion of the wall of the pipe against the left-facing surface 98 of the promontory 90 of the die. The punch and die are then squeezed hard together, which coins the portion of the wall of the pipe between the surfaces 96,98.

Referring again to U.S.A. patent U.S. Pat. No. 5,487,294, FIGS. 3, 4, 5 of that patent may be compared with FIGS. 7, 8, 9 herein, and it will be understood that the pipe-end in the present FIG. 9 is now in the same condition as was depicted in FIG. 5 of '294 (except that the pipe now has a clip-receiving recess). The required conical flanged form of the quick-connect coupling can now be produced on the pipe end in the manner as depicted in FIGS. 7, 8, 9 of '294, i.e by striking the pipe-end axially with the appropriately-shaped punch.

We claim:

1. A tubular pipe having a formed end-shape at the left-end thereof, wherein:

the pipe has a metal wall of nominal internal diameter ID and external diameter OD;

the end-shape includes a flange, in which the metal of the pipe wall is formed to a diameter FD, measured externally, and FD is greater than OD;

the flange has left and right radially-extending walls;

the right wall of the flange has a right-facing surface, being a surface of the metal that faces rightwards, away from the left-end of the pipe;

the end-shape includes a recess, which is formed in the metal of the pipe wall;

in the recess, the metal of the pipe wall is formed to a diameter RD, measured internally, and RD is less than ID;

in the end-shape, the recess is positioned immediately to the right of the rightwards-facing surface of the flange;

the recess has a left extremity and a right extremity, and the arrangement of the end-shape is such that the left extremity of the recess forms a radially-inwards extension of the right-facing surface of the flange.

2. Pipe of claim 1, wherein the right-facing surface lies approximately perpendicular to the pipe-axis.

3. Pipe of claim 1, wherein the pipe is of its nominal diameter, immediately and contiguously to the right of the right extremity of the recess.

4. Pipe of claim 1, wherein the left wall of the flange is tapered conically.

5. Pipe of claim 1, wherein:

the end-shape includes a seal-lead-in portion, which lies to the left of the left wall of the flange;

the seal-lead-in portion has a diameter, measured internally, of SD, and SD is smaller than ID;

and RD is no smaller than SD.

6. Pipe of claim 1, in combination with a securement clip and a coupling-body, wherein:

the pipe having the shaped end-shape is assembled as a quick-connect coupling to the coupling-body, and is secured thereto by means of the clip;

the arrangement of the end-shape is such that, when the clip and the end-shape are assembled to the coupling-body, the clip lies immediately to the right of the right-facing surface of the flange;

the clip has a radially-innermost extremity, which lies at a position that is radially-inwards of the external diameter of the pipe.

7. Pipe of claim 1, wherein the recess formed in the end-shape is of the configuration that results from the wall of the pipe being pushed radially inwards with a rotating roller.

8. Pipe of claim 1, wherein the recess formed in the end-shape is of the configuration that results from:

first, a female die being pushed axially onto the left end of the pipe, to swage-in the end-shape, to form the right extremity of the recess;

and then a male die being pushed axially into the left end of the pipe, to swage-out the end-shape, to form the left extremity of the recess.

* * * * *